UNITED STATES PATENT OFFICE.

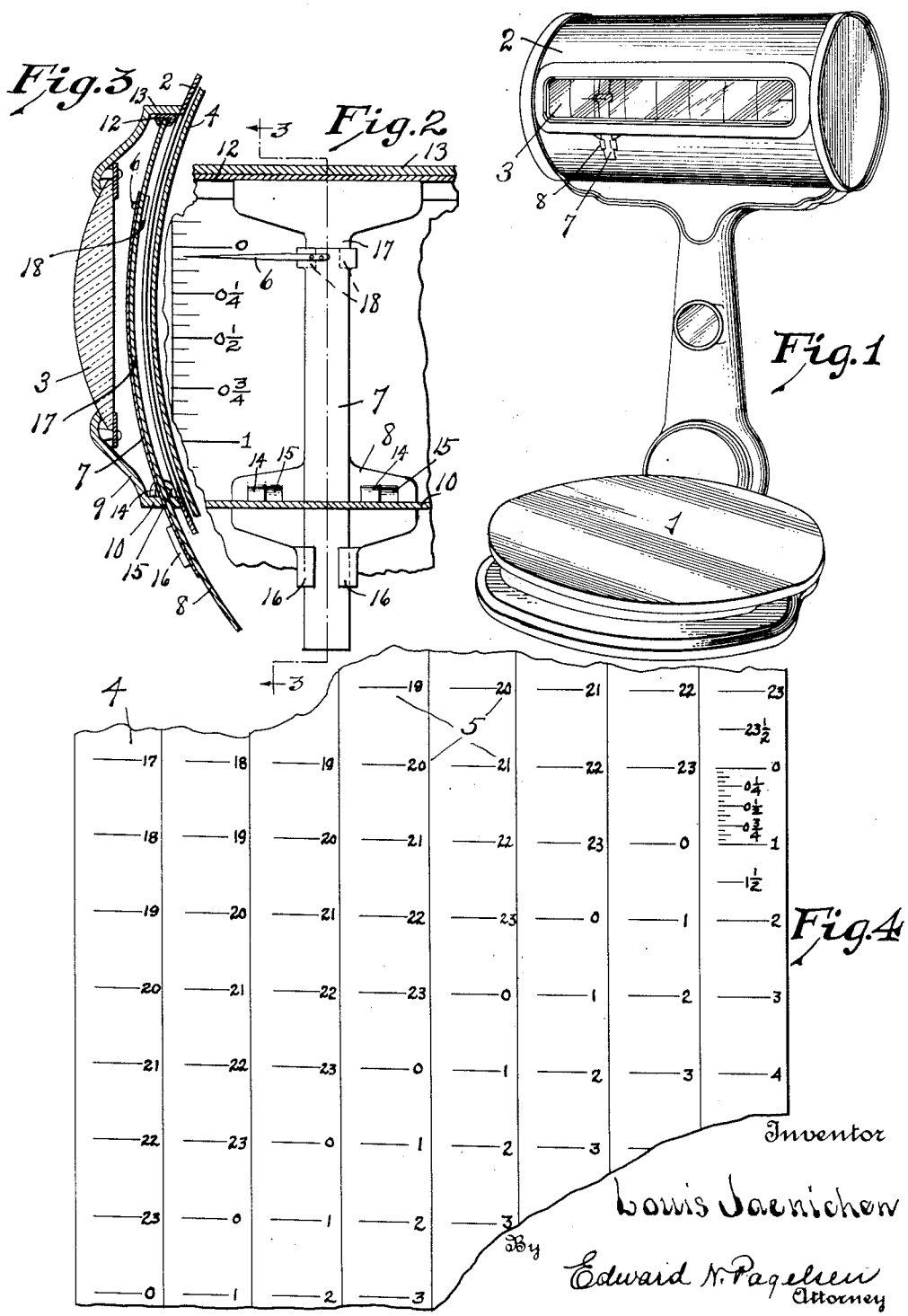

LOUIS JAENICHEN, OF DETROIT, MICHIGAN, ASSIGNOR TO THE STANDARD COMPUTING SCALE COMPANY, OF DETROIT, MICHIGAN, A CORPORATION OF MICHIGAN.

SCALE.

1,356,287.   Specification of Letters Patent.   Patented Oct. 19, 1920.

Application filed January 30, 1920. Serial No. 355,084.

*To all whom it may concern:*

Be it known that I, LOUIS JAENICHEN, a citizen of the United States, and residing at Detroit, in the county of Wayne and State of Michigan, have invented a new and Improved Scale, of which the following is a specification.

This invention relates to the weight indicating mechanism of scales, particularly to those of the cylinder-chart type, and its object is to provide an indicating mechanism whereby tare may be provided for within very wide limits, without the use of counterweights or other weight resisting mechanism.

This invention consists in a weight indicator comprising a plurality of series of weight indications, properly spaced for the particular construction of the weighing mechanism with which it is associated, the several series of weight indications being shifted relative to each other, and of a pointer adapted to be moved to coöperate with any one of the series.

It further consists in combination with a cylindrical weight indicator having a plurality of circumferential series of graduations, of a longitudinally and circumferentially movable pointer adapted to be positioned to properly coöperate with any one of the series of graduations.

It also consists in the details of construction illustrated in the accompanying drawing and particularly pointed out in the claims.

In the accompanying drawing, Figure 1 is a perspective view of a scale having a cylindrical chart bearing the weight indications. Fig. 2 is an elevation of the movable pointer and the parts on which it is mounted. Fig. 3 is a section on the line 3—3 of Fig. 2. Fig. 4 is a portion of an indicating chart.

Similar reference characters refer to like parts throughout the several views.

In scales of the type shown in Fig. 1 and also shown in my prior Patent No. 1,231,026, dated June 26, 1917, a cylindrical drum, preferably of paper, is turned angular distances proportionate to the weights placed upon the platform 1. A cylindrical shell 2 is provided with a window 3 through which the graduations of the indicating drum may be observed. In the present case the chart or sheet 4 which is rolled up to constitute this indicating drum is provided with a plurality of circumferential series of conventional weight indications 5, which in actual use will depend upon the character of the scale mechanism. Each of the several series of graduations is shifted circumferentially relative to the next adjacent series, preferably a distance a little less than the width of the window 3, the chart shown in Fig. 4 having its several series of indications shifted distances equaling the circumferential distance the drum is moved when a unit of weight is placed on the load receiver, but this shifting may be varied as desired. It is to be understood that the several series of indications may be on separate strips, one for each series, or they may all be printed on a single sheet whose width is equal to the length of the window in the shell 2. While I prefer to shift these series of indications progressively, as shown in Fig. 4, this is not necessary, for any other arrangement may be adopted so long as a zero mark of one of the series is visible through the window when the drum is turned less than a predetermined angular distance.

Coöperating with the indicating drum 4 is a longitudinally and circumferentially movable pointer 6 which is mounted on a circumferentially slidable pointer support 7, which in turn is mounted on a longitudinally movable carrier 8. The frame 9, which holds the window 3 in position, is provided with a slot in its lower flange 10. A channel strip 12 or other guide is secured to the inner face of the upper flange 13 of the window frame and serves as a guide for the carrier 8. This carrier has forwardly and rearwardly bent tongues 14 and 15 struck up from the lower portion of the carrier, which tongues ride on the upper face of the lower flange 10 at each side of the slot in the same. Below these tongues and the flange 10 an extension of the carrier is provided with guide fingers 16 for the lower part of the pointer support 7. The intermediate part 17 of the carrier is about the width of the pointer support which is formed with guide fingers 18 which fit around this part 17.

The pointer support 7 is therefore slidable on the carrier 8 circumferentially of the drum and both the support and carrier are curved parallel to the surface of the indicating drum so that the pointer may always be very close to and at the same distance from the drum. By reason of the movement of the carrier 8 longitudinally of the drum and by reason of the circumferential movement of the pointer support 7 on the carrier 8, the pointer 7 can be moved to indicate any graduation visible through the window in the shell.

When it is desired to weigh hams, shoulders, strips of bacon, raisins, or other wrapped articles of commerce which are incased in a standard wrapper, one of these wrappers is placed on the load receiving platform, which will cause the weight indicating drum to turn. The operator then slides the carrier 8 longitudinally and the pointer support 7 circumferentially until the pointer 6 is directly over the zero indication of one of the circumferential series. This then takes care of the standard tare. When hams or other articles incased in the standard wrappings are now placed on the platform, the pointer will indicate the net weight of the hams or other incased articles.

Receptacles intended for merchandise may be placed on the load receiver and after the indicator drum has come to rest the pointer 6 is moved to register with the zero of one of the circumferential series of weight indications, after which the weight of the articles placed in the receptacles will be correctly indicated by means of the graduations of that series.

The construction of the pointer support and carrier and the means for guiding them and the details and proportions of the other parts shown in the drawings may all be varied by those skilled in the art without departing from the spirit of my invention as set forth in the following claims.

I claim:—

1. A weight indicator for scales comprising a rotatable drum bearing a plurality of circumferential series of weight indications, each series being shifted circumferentially relative to the adjacent series, a pointer, and means to support the pointer adjacent said drum comprising two parts one movable longitudinally of the drum and the other part mounted on the first and movable circumferentially of the drum.

2. In a scale, the combination of a shell provided with a longitudinal window, an indicating drum rotatably mounted within the shell and bearing a plurality of circumferential series of weight indications, each series being shifted circumferentially relative to the adjacent series, a pointer, and shiftable means to support the pointer adjacent the drum and movable to carry the pointer to any desired character visible through the windows.

3. In a scale, the combination of a horizontal cylindrical shell provided with a longitudinal window and a frame therefor having horizontal flanges, the lower flange having a longitudinal slot, a horizontal indicating drum rotatably mounted within the shell and bearing a plurality of circumferential series of weight indications, each series being shifted circumferentially relative to the adjacent series, a pointer, means whereon the pointer is supported, which means are movable to carry the pointer to any weight indication visible through the window, a carrier on which said pointer support is vertically movable, said carrier and support projecting down through the slot in the lower flange of the window frame, where they may be reached so that the pointer may be adjusted, and means to guide the upper portion of said carrier.

4. In a scale, the combination of a chart bearing a plurality of series of weight indications, each series being shifted relative to the adjacent series, a pointer, and means for supporting the pointer, said pointer being shiftable relative to the chart so as to coöperate with any one of the several series of indications and also along any one of the series to a predetermined indicator of the series.

5. In a scale, the combination of a chart bearing a plurality of similar series of weight indications, each series being shifted relative to the adjacent series, a pointer, means for supporting the pointer, said pointer being shiftable relative to the chart so as to coöperate with any one of the several series of indications and also along any one of the series to a predetermined indicator of the series, and a guide whereon the supporting means for the pointer are slidably mounted.

6. A weight indicator for scales comprising a rotatable drum bearing a plurality of circumferential series of graduations, each series being shifted circumferentially relative to another series, and an indicating device movable longitudinally and circumferentially of the drum.

7. A weight indicator for scales comprising a movable chart bearing a plurality of series of weight graduations, each series being shifted longitudinally of the adjacent series, and an indicating device movable from one series to another and also movable longitudinally of each series.

LOUIS JAENICHEN.